United States Patent
Trunick et al.

(10) Patent No.: US 7,600,700 B2
(45) Date of Patent: Oct. 13, 2009

(54) ROTATING FLUID JET WITH IMPROVED ROTARY SEAL

(75) Inventors: Daniel D. Trunick, Wixom, MI (US); Matthew O. Herhold, Fenton, MI (US)

(73) Assignee: NLB Corp., Wixom, MI (US)

( * ) Notice: Subject to any disclaimer, the term of this patent is extended or adjusted under 35 U.S.C. 154(b) by 0 days.

(21) Appl. No.: 11/514,517

(22) Filed: Sep. 2, 2006

(65) Prior Publication Data
US 2008/0054095 A1    Mar. 6, 2008

(51) Int. Cl.
B05B 3/06    (2006.01)

(52) U.S. Cl. .................. 239/251; 239/252; 239/259; 239/DIG. 4; 239/525; 277/361; 277/585

(58) Field of Classification Search .................. 239/251, 239/252, 259, 261, 600, DIG. 4, 525, 526; 277/361, 558, 585
See application file for complete search history.

(56) References Cited

U.S. PATENT DOCUMENTS

| | | | | |
|---|---|---|---|---|
| 3,599,490 | A * | 8/1971 | Love et al. ................. | 277/558 |
| 4,690,325 | A * | 9/1987 | Pacht .......................... | 239/264 |
| 5,083,802 | A | 1/1992 | Shimasaki | |
| 5,253,809 | A * | 10/1993 | Poppitz et al. ............... | 239/257 |
| 5,909,848 | A * | 6/1999 | Zink .......................... | 239/252 |
| 5,964,414 | A * | 10/1999 | Hardy et al. ................. | 239/252 |
| 6,325,381 | B1 | 12/2001 | von Engelbrechten | |
| 6,431,552 | B1 | 8/2002 | Ulrich | |
| 6,561,520 | B2 | 5/2003 | Kalsi | |
| 6,698,669 | B2 * | 3/2004 | Rieben ....................... | 239/261 |
| 6,957,605 | B1 | 10/2005 | Blume | |
| 6,997,461 | B2 | 2/2006 | Smith | |

OTHER PUBLICATIONS

Drawings of typical seal designs.

* cited by examiner

*Primary Examiner*—Steven J Ganey
(74) *Attorney, Agent, or Firm*—Carlson, Gaskey & Olds

(57) ABSTRACT

An improved seal for use in fluid systems such as a water jet system includes an outer seal point that is very close to an inner seal point. By spacing these two seal points very close together, the force on the seal is greatly reduced compared to the prior art. In the disclosed embodiment, the outer seal point is on an angled forward face of the seal that abuts a back-up ring angled face. The inner seal point is between the seal and an internal shaft which rotates relative to a housing.

11 Claims, 2 Drawing Sheets

ROTATING FLUID JET WITH IMPROVED ROTARY SEAL

BACKGROUND OF THE INVENTION

This application relates to an improved seal for use at a rotating nozzle to housing interface in systems such as high pressure water jetting systems.

High pressure water jetting systems are known, and are used to apply very high pressure water against surfaces to be cleaned. In such systems, a hand-held lance or a robot mounted cleaning member has a housing that mounts a rotating nozzle. The nozzle has a plurality of jets at an angle relative to a rotational axis of the nozzle. As high pressure water is delivered outwardly of the jets, forces on the nozzle cause it to rotate within the housing.

In the prior art, a seal between the housing and a shaft of the nozzle has a sealing surface at both radially outer and radially inner surfaces. The radial inner surface was typically on the shaft and the radially outer surface was within the housing. These two sealing points at those locations creates a force on the seal over a relatively large area. This relatively large area causes high temperature levels on the seal, and results in seals failing earlier than would be desirable.

SUMMARY OF THE INVENTION

In the disclosed embodiment of this invention, a seal is not provided with any seal point on an outer peripheral surface. Instead, an end surface of the seal provides a seal point, close to a point on a radially inner peripheral surface of the seal. The seal is disclosed as having an angled end face that contacts a mating angle end face on a back-up ring. An outer seal point is formed between this end surface on the seal and the angled face on the back-up ring. Further, an inner seal point is provided between the seal and a shaft of the rotating nozzle.

With this arrangement, the force on the seal is over a much smaller area, and the total force is thus reduced. The amount of heat generated is reduced, and consequently the life of the seal is increased significantly.

These and other features of the present invention can be best understood from the following specification and drawings, the following of which is a brief description.

DETAILED DESCRIPTION OF THE PREFERRED EMBODIMENT

Figure 1:
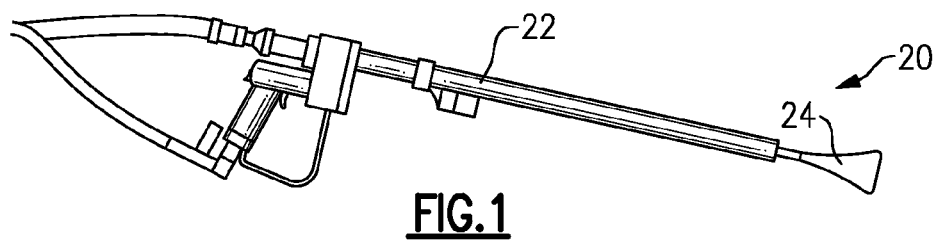
FIG. 1 schematically shows a fluid cleaning lance.

A cleaning lance 20 is illustrated in FIG. 1. As known, the cleaning lance 20 is hand held and has a stationary housing 22 mounting a rotating nozzle 24. High pressure fluid, and typically water, jets outwardly of the nozzle and against the surface to be cleaned. While this lance is shown, it should be understood that the present application would extend to other types of systems for jetting fluids, and for any system having a rotating nozzle. As one example only, the invention extends to robotic mounted for fluid cleaning structures.

Figure 2A:
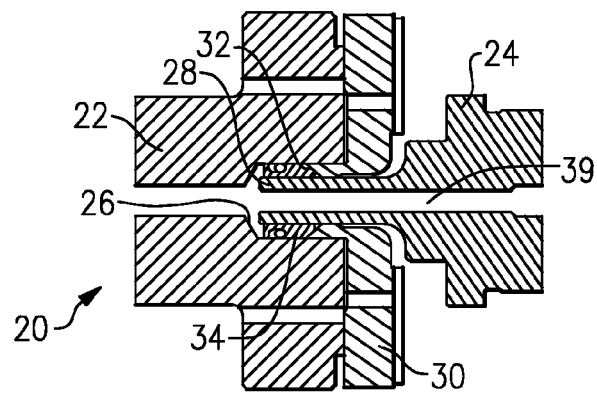
FIG. 2A is a cross-sectional view of the prior art seal.

As shown in FIG. 2A, the nozzle 24 is received within the housing 20. An inner cavity 26 in the housing receives a shaft end 28 from the nozzle 24. A back-up ring 30 is secured to the housing 22, and has an angled end face 32 abutting a surface of the seal 34.

Figure 2B:
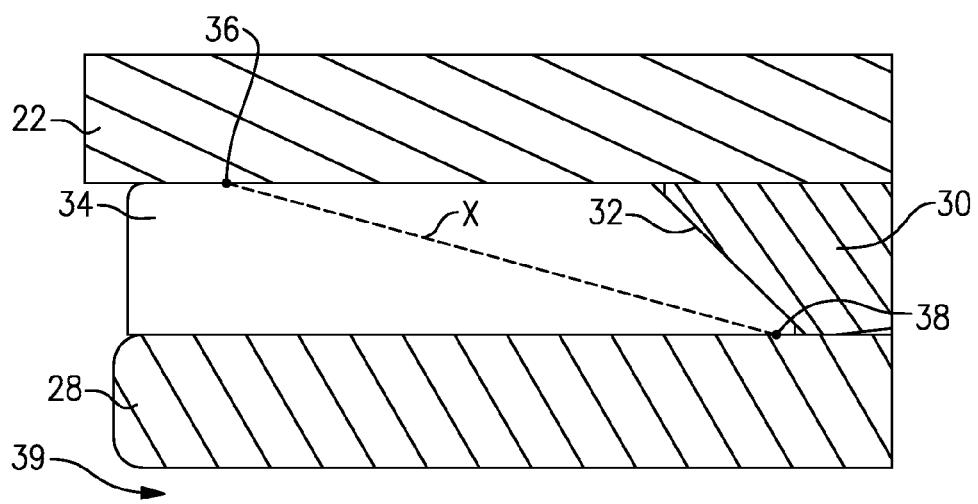
FIG. 2B shows features of the prior art seal.

As shown in FIG. 2B, the seal 34 creates an outer seal point 36 and an inner seal point 38. The outer seal point 36 is on the housing 22, and the inner seal point 38 is on the shaft 28. It can be shown that a line X between points 36 and 28 represents the theoretical surface that gets loaded under pressure when high pressure fluid is being delivered to a bore 39 within the shaft 28. The relatively large loaded surface area results in a relatively high force being placed on the seal, and relatively high temperatures developing adjacent the seal. This can result in undesirably short seal life.

Figure 3A:
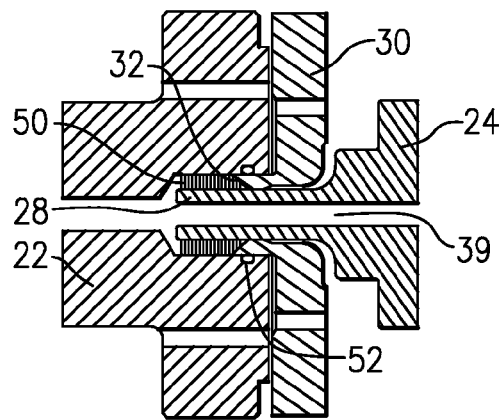
FIG. 3A is a cross-sectional view of the inventive seal arrangement.

FIG. 3A shows an inventive arrangement wherein the seal 50 has an o-ring 52 mounted beyond the seal and in the housing 22. The end face 32 of the back-up ring 30 abuts the seal 50 as in the prior embodiment.

Figure 3B:
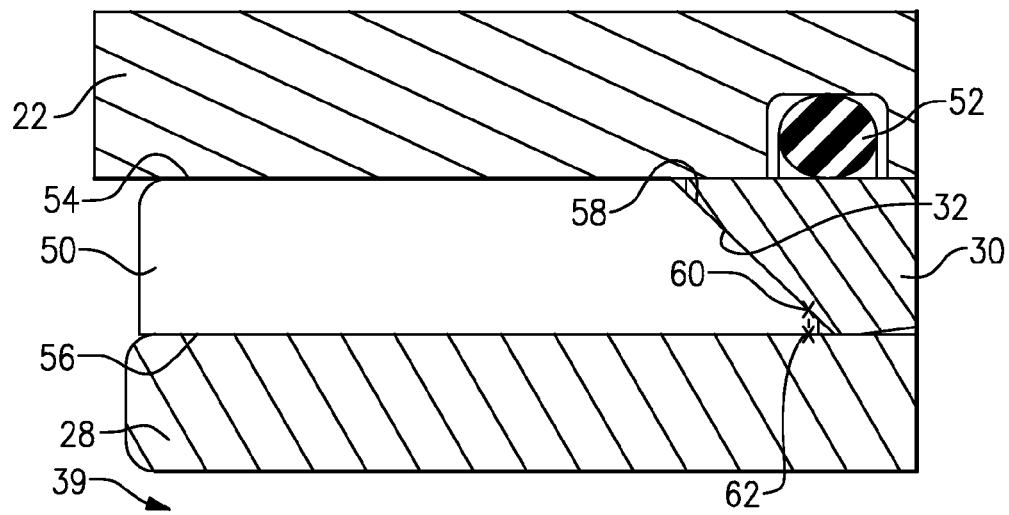
FIG. 3B shows details of the inventive seal arrangement.
Figure 3C:
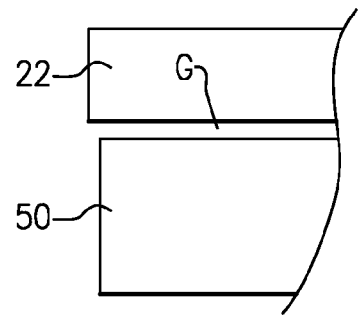
FIG. 3C shows a detail of the inventive seal arrangement.

However, as shown in FIG. 3B, the outer seal point 60 is now on the angled forward face 58 of the seal 50, and the inner seal point 62 is adjacent that seal point. Now, a straight line drawn between points 60 and 62 will be extremely short when compared to the FIG. 3 embodiment. This reduces the load area on the seal, and reduces the overall force on the seal. Stated another way, there is a gap between an outer surface 54 of the seal 50 and the housing 22. Stated another way, there is a gap or clearance G between an outer surface of the seal and an inner surface of the housing or the cavity, see FIG. 3C.

While the surface 32 is shown to be angled, in fact it could be bowed or curved, or even flat in certain applications.

By this arrangement, the seal provides valuable benefits and is relatively long-lived compared to the prior art.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A fluid delivery system comprising:
   a housing;
   a nozzle;
   one of said housing and said nozzle including a shaft extending into a cavity, said nozzle rotating relative to said housing;
   a structure defining an end face of said cavity, and said shaft extending through a bore in said structure and into said opening;
   a seal received between an outer surface of said shaft and an inner surface of said cavity, said seal having a forward face abutting said structure to provide an outer seal point between said seal and said structure, and said seal further sealing on an outer peripheral surface of said shaft;
   said seal being dimensioned such that there is a clearance between an outer periphery of said seal and the inner surface of said cavity; and
   one of said housing and said structure including a recess receiving a back-up seal, said back-up seal creating a seal blocking fluid flow from said clearance passing said back-up seal.

2. The system as set forth in claim 1, wherein said shaft is part of said nozzle and said cavity is in said housing.

3. The system as set forth in claim 2, wherein said structure is formed separate from said housing.

4. The system as set forth in claim 2, wherein said structure is a back-up ring having an angled surface facing said seal, said seal having a mating angled surface in contact with said angled surface on said back-up ring, and said outer seal point being formed between said angled surfaces.

5. The system as set forth in claim 1, wherein said nozzle is a rotating fluid jet nozzle, and said system is a cleaning system for delivering high pressure water against a surface to be cleaned.

6. The system as set forth in claim 1, wherein said back-up seal is an o-ring.

7. The system as set forth in claim 1, wherein said recess is formed in said housing.

8. A seal comprising:
   a seal body to be received between an outer surface of a shaft and an inner surface of a housing, said seal body having a forward face for abutting a structure to provide an outer seal point between said seal body and the structure, and said seal body further creating an inner seal point for sealing on an outer peripheral surface of the shaft; and
   said seal being dimensioned such that there is a clearance between an outer periphery of said seal and the inner surface of the housing, said clearance being formed between an outer periphery of said seal and the inner surface of the housing along an entire axial length of said seal.

9. The seal as set forth in claim 8, wherein the structure is a back-up ring having an angled surface facing said seal body, said seal body having a mating angled surface to contact the angled surface on the back-up ring, and said outer seal point being formed by said angled surface.

10. The seal as set forth in claim 8, wherein the seal is for use in a cleaning system for delivering high pressure water against a surface to be cleaned.

11. A fluid delivery system comprising:
   a housing;
   a nozzle;
   one of said housing and said nozzle including a shaft extending into a cavity, said nozzle rotating relative to said housing;
   a structure defining an end face of said cavity, and said shaft extending through a bore in said structure and into said opening;
   a seal received between an outer surface of said shaft and an inner surface of said cavity, said seal having a forward face abutting said structure to provide an outer seal point between said seal and said structure, and said seal further sealing on an outer peripheral surface of said shaft; and
   said seal being dimensioned such that there is a clearance between an outer periphery of said seal and the inner surface of said cavity, said clearance being formed between an outer periphery of said seal and the inner surface of the cavity along an entire axial length of said seal.

\* \* \* \* \*